(No Model.)  2 Sheets—Sheet 1.
E. KIPPER.
CUTTING SHEETS OF ZYLONITE AND OTHER PLASTIC COMPOUNDS FROM A CYLINDRICAL BLOCK.
No. 299,803.  Fig. 1.  Patented June 3, 1884.
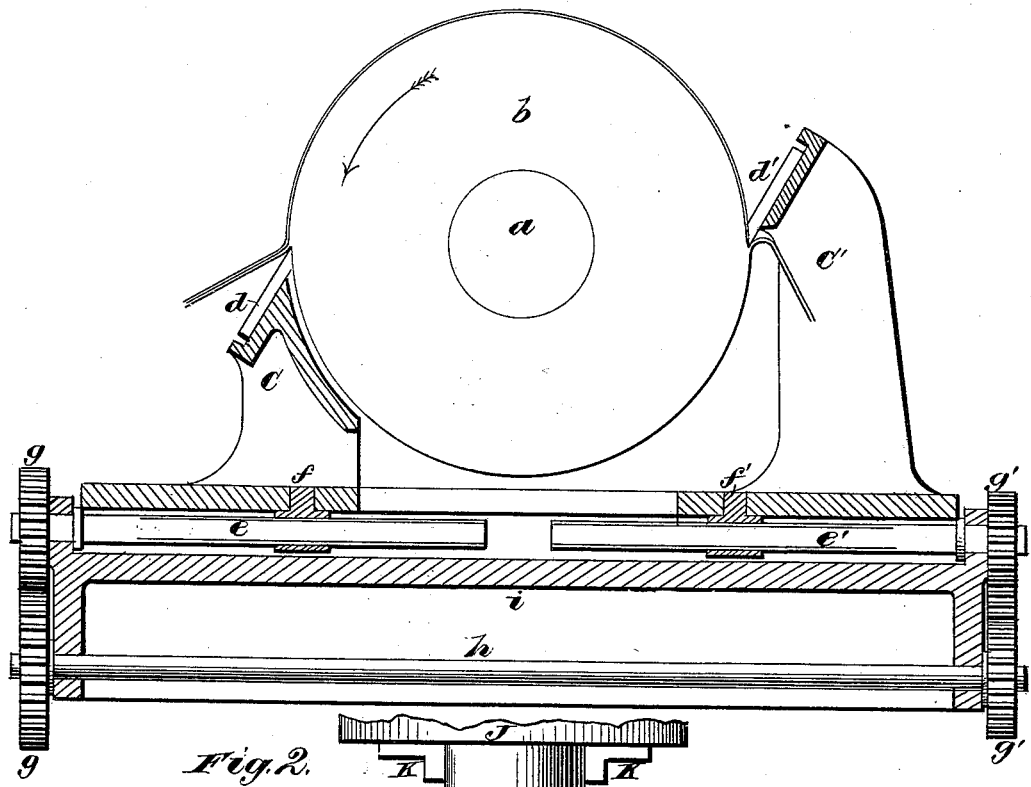
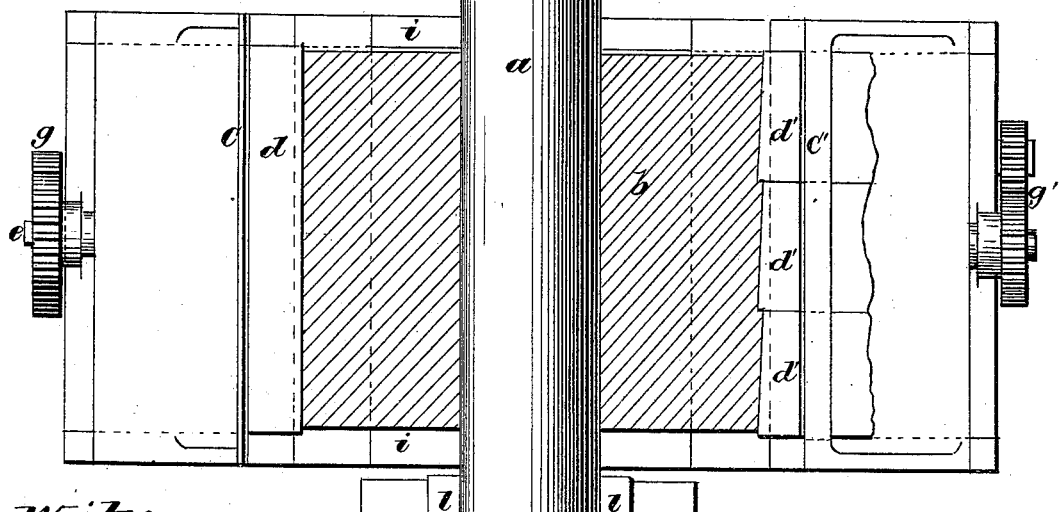
Fig. 2.
Witnesses,
Robert Everett,
Vinton Coombs
Inventor,
Emil Kipper.
By James L. Norris.
Atty.

(No Model.) 2 Sheets—Sheet 2.
E. KIPPER.
CUTTING SHEETS OF ZYLONITE AND OTHER PLASTIC COMPOUNDS FROM A CYLINDRICAL BLOCK.
No. 299,803. Patented June 3, 1884.
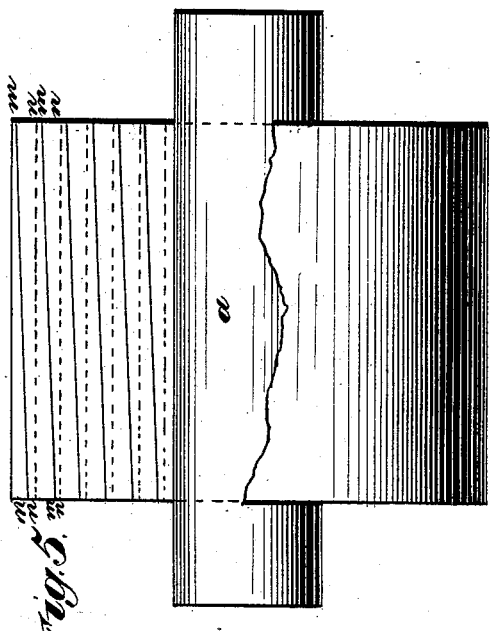
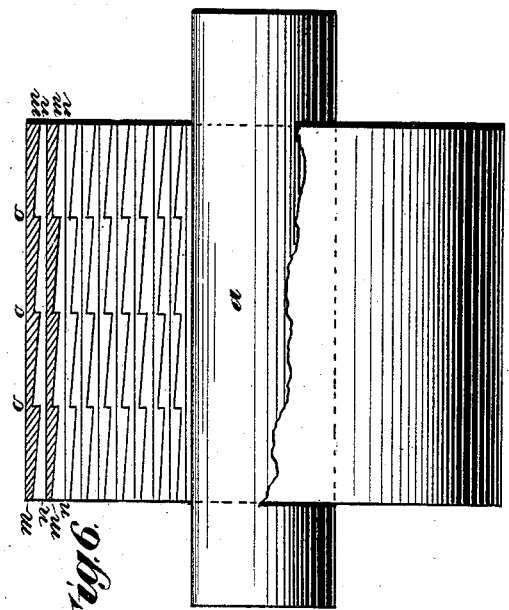
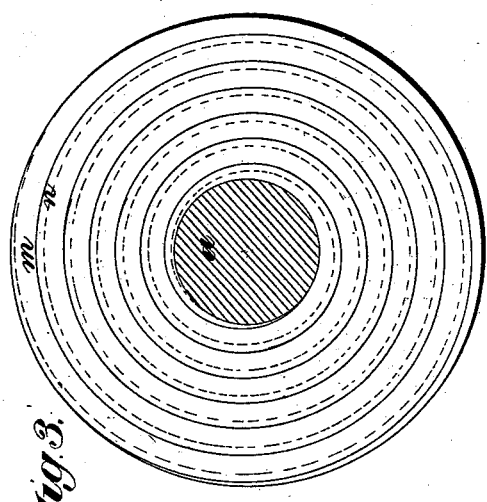
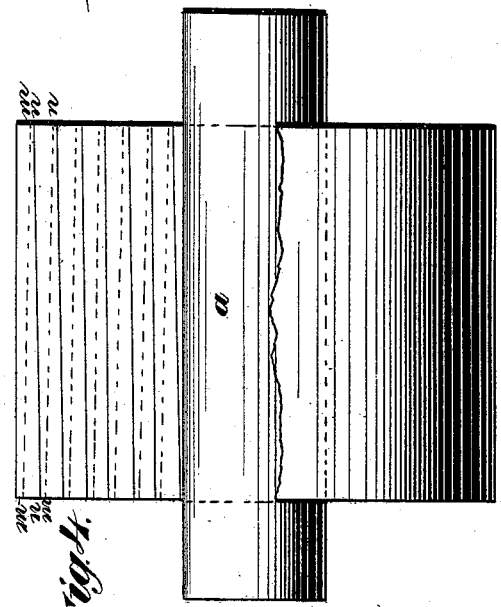
Witnesses:
Robert Everett
Vinton Coombs
Inventor:
Emil Kipper:
By James L. Norris.
Atty.

UNITED STATES PATENT OFFICE.

EMIL KIPPER, OF ADAMS, MASSACHUSETTS.

CUTTING SHEETS OF ZYLONITE AND OTHER PLASTIC COMPOUNDS FROM A CYLINDRICAL BLOCK.

SPECIFICATION forming part of Letters Patent No. 299,803, dated June 3, 1884.

Application filed December 26, 1883. (No model.)

*To all whom it may concern:*

Be it known that I, EMIL KIPPER, a subject of the King of Prussia, residing at Adams, in the county of Berkshire and State of Massachusetts, have invented new and useful Improvements in Cutting Sheets of Zylonite and other Plastic Compounds from a Cylindrical Block, of which the following is a specification.

Hitherto such sheets with their opposite surfaces inclined to each other have been cut from slabs or blocks of a compound, only such slabs being confined and reciprocating as veneer blocks do, and having sheets cut from them by a veneer-knife in a machine which is substantially a cutting-machine. In the use of this process it is impossible to produce sheets or plates of zylonite or vulcanite, &c., longer than the length of the block of compound from which they are cut. Thin and long sheets many feet in length and thicker on one edge than the other are now required for various purposes in the arts, and can be produced in the manner which I have invented.

In the drawings, Sheet 1, Figure 1 is a sectional elevation showing the double cutting device of my sheeting-machine; and Fig. 2, a plan view of the same, showing the arrangement of the knives which produce sheets of plastic compounds thicker at one edge than the other; and Sheet 2, Figs. 3, 4, 5, and 6, views illustrating the manner of working my invention.

I take a cylinder of zylonite or other plastic compound made in any usual manner and supported and confined in any usual way upon a mandrel or axle, such as indicated at $a$ in the different figures. There are several known ways of forming and mounting and confining such cylinders upon mandrels. I then place this cylinder with its mandrel in the machine, the general appearance of which represents a cutting-machine such as used for cutting continuous sheets of zylonite, celluloid, or other plastic compounds.

This class of machine was first invented for cutting a sheet of ivory by a spiral cut from a tusk, and used under many forms, without improvements, subsequently for cutting thin sheets of hard or soft rubber, celluloid, zylonite, and the like compounds spirally from a cylinder.

I supply the machine with two knives in place of one, (as is usual,) constructing, supporting, and feeding each of these knives in any usual manner and by any usual means, and place them in such relation to the cylinder of the compound that they will act at the terminations of different radii of the cylinder, or, in other words, upon different lines drawn longitudinally upon the outside of the cylinder.

So far as I know the knife of such machines as above referred to has always had its edge parallel to the axis of the cylinder which is being cut into a sheet; consequently it cuts a sheet of even thickness at the two edges thereof, the thickness depending upon the amount of feed of the knife at each revolution of the cylinder. If this knife were inclined to the axis of the cylinder and the sides of the cylinder parallel also with the axis, it would cut a sheet of different thickness at the edges, of a length of about one circumference of the cylinder; but as soon as the cylinder had made one revolution, then and afterward the sheet would be cut of equal thickness on both edges. That this would be the effect will be explained after examination of Figs. 3 and 5, when, supposing the full lines to represent the cut made by a single inclined knife acting at $m$, it will be seen that the sheet will have its opposite surfaces inclined for a length equal to one circumference, and after that parallel surfaces. The lines $m$ $m$, Fig. 5, are longitudinal lines of cut, and the full lines on Fig. 3 the spiral, indicating, it being evident, that the distances from $m$ to $m$ on one end of the cylinder, Fig. 5, are the same as the distances from $m$ to $m$ on the other end thereof. If, however, I apply to the cylinder a second knife acting to cut the lines $n$ $n$ parallel to the axis and also spirally, as shown by the dotted lines in Fig. 3, then the sheet whose transverse section is bounded by $m$ $m$ $m$ $m$ will be split as it is cut and converted into two sheets whose transverse sections are bounded by $m$ $m$ $n$ $n$ and $n$ $n$ $m$ $m$, and each of these sheets will be of different thicknesses on the opposite edges thereof and the opposite surfaces of the sheets will not be parallel. The same effect can be produced, as indicated in Fig. 4, by using two knives, both set on an angle to the axis of the cylinder of the compound.

There must, in order to carry out my process, be at least two knives present and acting in the machine, and one at least of these knives must be set and held with its edge inclined to the axis of the cylinder which is being cut; also, the feed traversing the knife stands or carriages $c\ c'$, to which the knives $d\ d'$ are affixed must be equal to the sums of the thickness of two sheets for both carriages, or, in other words, equal to the distance from $m$ to $m$ in Figs. 3 and 5. By using four knives, I can cut four sheets at a time, all of them with their opposite surfaces inclined to each other; or by six or eight knives, I produce six or eight bevel-sheets. It is, however, necessary that half the number of knives used must have their edges set and held at an inclination to the axis of the cylinder.

When I desire to produce sheets narrower than the length of the cylinder, or ribbons with edges of unequal thickness, I divide either of the knives $d\ d'$ into lengths, as indicated at $d''\ d''\ d''$, Fig. 2, producing three ribbons on one sheet, the sum of whose widths equals the length of the cylinder, and all of them having their opposite surfaces inclined to each other, the plain side of the sheet or sheets being cut by a single long knife, as shown at $d$, Fig. 2; or, if I desire, I can cut both surfaces by a series of short knives whose edges are set and held on an angle to the axis of the cylinder, and oppositely on an angle to themselves. The number of ribbons may be varied according to wish by making the short knives longer or shorter, as in Fig. 6, which shows four ribbons instead of three, as shown at Fig. 2. These ribbons may also be of different widths by varying the lengths of the knives. When cutting ribbons they may be divided each from the other by knives so supported and cutting so as to form surfaces parallel to the ends of the cylinder, as indicated at $o\ o$, Fig. 6.

As a modification of this last-described modification of my invention, I sometimes intend to use a knife with a corrugated edge, and in conjunction a knife with a straight edge, thus cutting at the same time two sheets, each corrugated on one surface and plain on the other, as illustrated in detail in Fig. 7 of the drawings.

Figs. 1 and 2 show the general arrangement of my cutting device, the letters having reference to detail parts. $a$ is the mandrel carrying and supporting the cylinder of composition $b$; $c$ and $c'$, the stands or carriages supporting and carrying the cutting-knives $d$ $d'$; $e$ and $e'$, the feed-screws, and $f$ and $f'$ the nuts of same attached and propelling the carriages $c$ and $c'$; $g$ and $g'$, the gears rotating the feed-screws $e$ and $e'$; $h$, the shaft rotating the gears $g$ and $g'$; $i$, the framing of the cutting device; $j$, the chuck attached to a rotating spindle; $k$, the jaws of same holding and rotating the mandrel $a$, carrying a cylinder of composition in front of the knives $d$ and $d'$; $l$, the support for the mandrel $a$ on the opposite end of the chuck $j$.

I have heretofore said that I intend to use any of the known machines used for cutting sheets from cylinders, and now say that I intend to use, if desirable, parts of one machine in connection with parts of some other—for instance, the knife-supporting contrivance of one machine with the feeding or cylinder revolving mechanism of another machine; but in all cases there must be used at least two knives acting upon the same cylinder of composition—such as zylonite, celluloid, and like compounds, and at least one of the knives must have its edge—that is, the line running along its edge—set and maintained during the cutting at an angle, as described, to the axis of the cylinder from which the sheets are being cut, the amplitude of said angle being governed by the difference of edge thickness required between the two edges of the sheets or ribbons which are to be cut. It will further be perceived that in all cases the edge of the knife cutting at $m\ m$ is not parallel, but at an angle with the edge of the knife cutting at $n\ n$, and that two succeeding cutting-knives, although one of them may be parallel at its edge with the axis of the cylinder, have always their edges inclined to each other.

Having thus described my invention, what I claim is—

1. The within-described method of cutting sheets of zylonite, celluloid, and like compounds, consisting in simultaneously cutting spirally from a roll of such material a series of sheets on a line at any angle to the axis of the roll, whereby are produced sheets of unequal thickness with their surfaces out of parallelism with each other, substantially as described.

2. In combination with a revolving mandrel suitable for carrying a cylinder of compound, and means for revolving the same, and for supporting and feeding the knives for cutting the cylinder into sheets, two knives, one of which has its edge set and maintained and fed at an angle to the axis of such mandrel, whereby sheets having edges of unequal thickness and surfaces inclined to each other may be cut spirally, substantially as described.

3. The method herein described of cutting sheets of zylonite, celluloid, and like compounds, consisting in simultaneously cutting spirally from a roll of such material, a series of sheets flat or plain on one side and corrugated upon the other side, substantially as described.

4. The within-described method of cutting sheets of zylonite, celluloid, and like compounds, consisting in simultaneously cutting spirally from a roll of such material a series of sheets on a line at an angle to the axis of the roll, and having each at least one surface of the form of a series of inclines, substantially as described.

In testimony whereof I have hereunto set my hand and seal in the presence of two subscribing witnesses.

EMIL KIPPER. [L. S.]

Witnesses:
 RUSL. B. DEAN,
 S. W. INGALLS.